United States Patent [19]

Becker

[11] 4,420,848
[45] Dec. 20, 1983

[54] METHOD AND APPARATUS FOR MANUFACTURING WELDED CAPPED WHEEL NUTS

[75] Inventor: Philip D. Becker, Southbury, Conn.

[73] Assignee: Buell Industries, Inc., Waterbury, Conn.

[21] Appl. No.: 368,764

[22] Filed: Apr. 15, 1982

[51] Int. Cl.³ .............................................. B21D 53/24
[52] U.S. Cl. .................................... 10/72 R; 10/86 C
[58] Field of Search ............. 10/72 R, 85, 86 R, 86 C, 10/86 CL; 219/78.01, 108, 113, 117.1; 411/375, 376, 428, 429, 430

[56] References Cited

U.S. PATENT DOCUMENTS

| | | | |
|---|---|---|---|
| 3,955,231 | 5/1976 | Erdmann | 10/86 C |
| 4,056,862 | 11/1977 | Chaivre et al. | 10/72 R |
| 4,123,961 | 11/1978 | Chaivre et al. | 10/86 C X |
| 4,143,578 | 3/1979 | Becker | 10/86 C X |
| 4,275,285 | 6/1981 | Jadach | 10/86 C X |

FOREIGN PATENT DOCUMENTS

| | | | |
|---|---|---|---|
| 512983 | 2/1955 | Italy | 10/86 C |
| 43322 | 11/1917 | Sweden | 10/86 C |

*Primary Examiner*—E. Michael Combs
*Attorney, Agent, or Firm*—St. Onge, Steward, Johnston & Reens

[57] ABSTRACT

A method and apparatus for wheel nut cap welding in which two capped wheel nuts are axially aligned with their capped ends facing one another and spaced apart from one another by a cylindrical electrically conductive ring the opposite ends of which contact the sheath of the capped nut adjacent the area at which the weld has to be formed. The capped nuts and ring are telescopically assembled within a cylindrical guide sleeve of insulating material so that the conical, threaded opening end of each of the nuts extends beyond the ends of the guide sleeve where they are each contacted by cylindrical electrodes having conical indentations to fit the nut conical ends. The cylindrical ring positioned between the nuts constitutes a connecting electrode within the guide sleeve of insulating material so that the electrical current may pass from one of the electrodes in contact with the conical end of a nut through the nut and connecting electrode and to the other electrode contacting the conical end of the other nut to form a welding circuit. The welding method and apparatus provides the advantages of producing two welded capped nuts per welding cycle while developing a more consistent welding current pattern and greater efficiency in use of welding current while utilizing an easily maintained electrode in contact with the sensitive welding surfaces of the caps.

12 Claims, 6 Drawing Figures

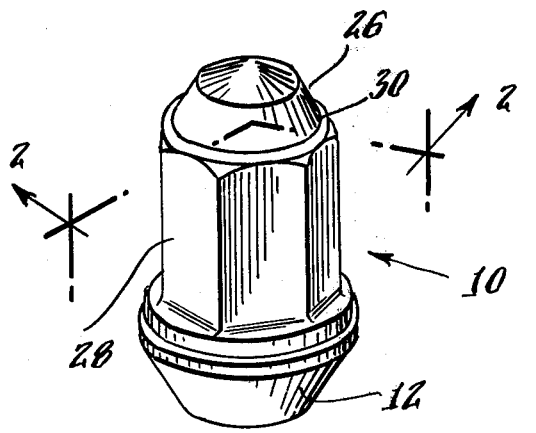
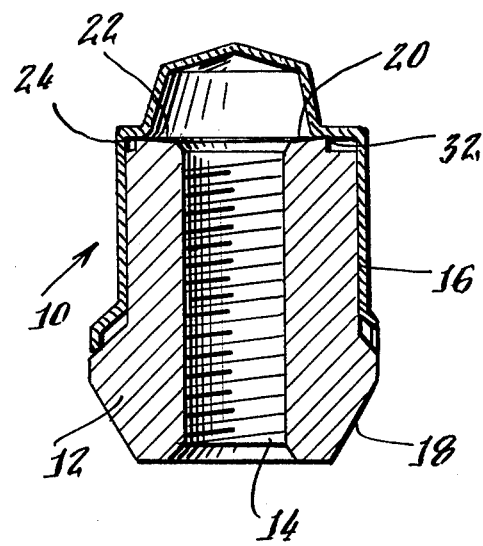
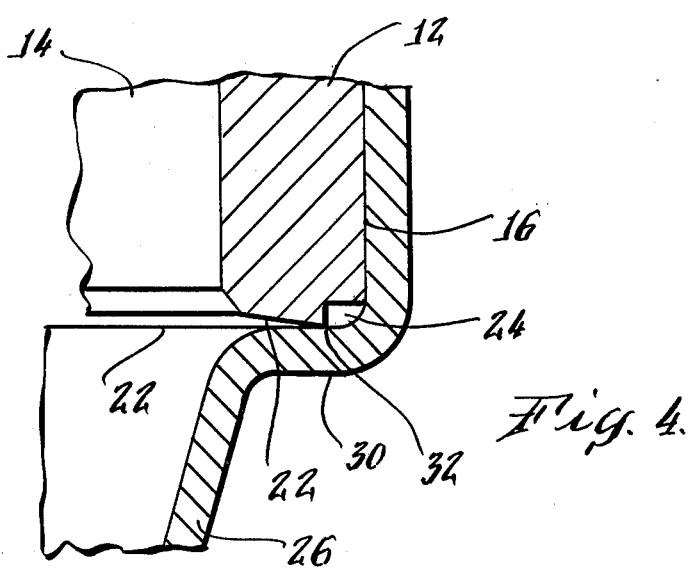
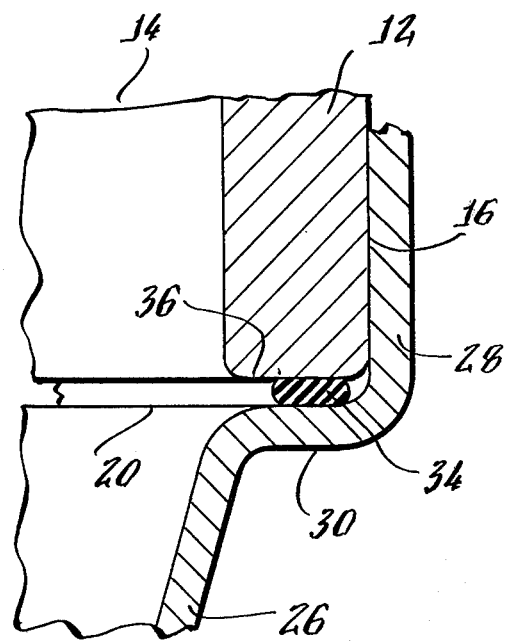

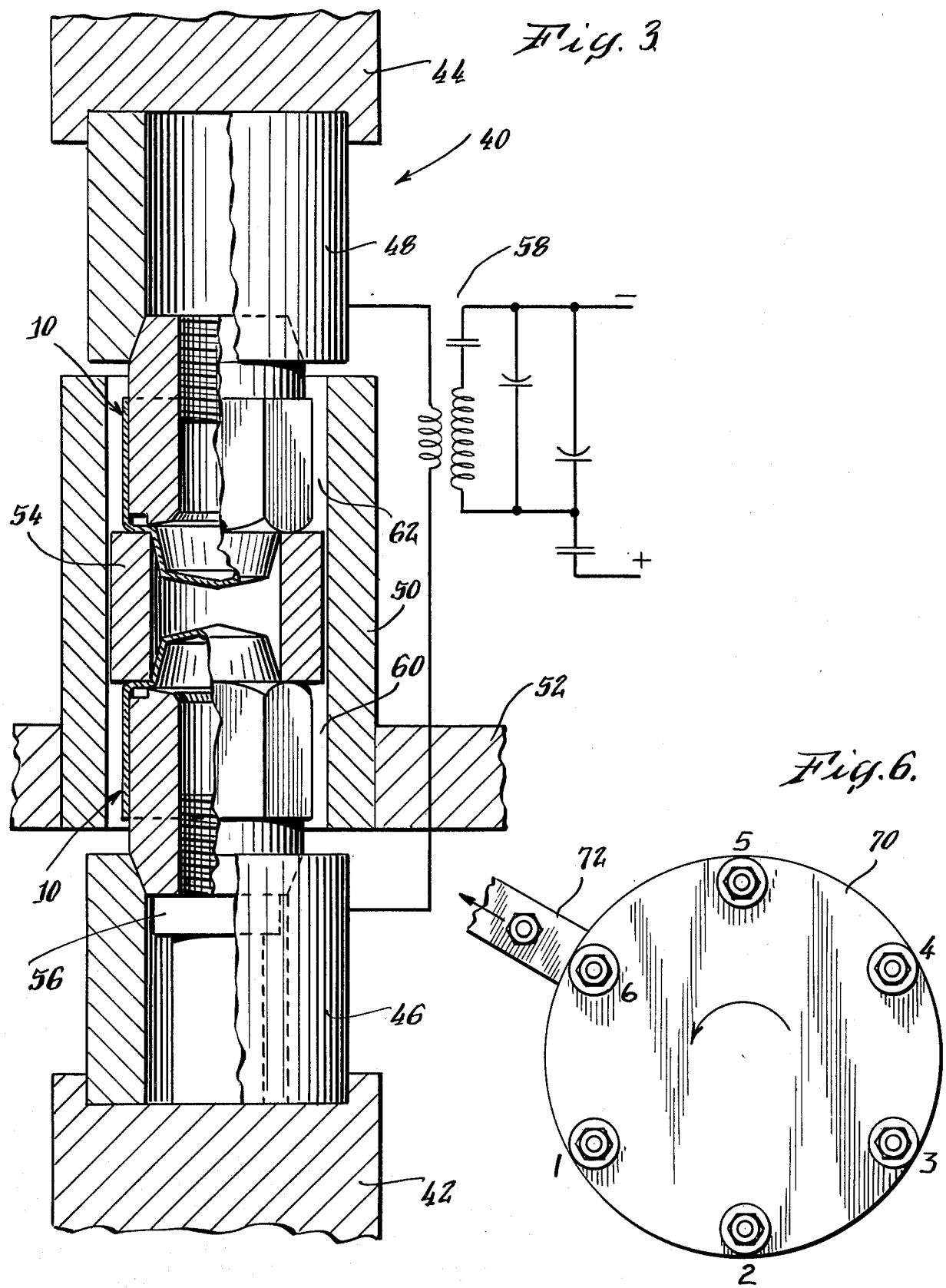

METHOD AND APPARATUS FOR MANUFACTURING WELDED CAPPED WHEEL NUTS

BACKGROUND OF THE INVENTION

This invention relates to capped wheel nuts and, more particularly, to a method and apparatus for welding a cap to a wheel nut.

Capped wheel nuts for threading onto studs to secure automotive wheels to the vehicle axle, while at the same time protecting the otherwise exposed projecting end of the stud from environmental damage and providing it with an asthetic appearance, are well known. Such capped wheel nuts generally have a conventional nut body with a threaded opening, a conical end, which is intended to bear against a conical depression in a wheel, and wrench flats forming a hexagonal perimeter by which the nut may be applied and tightened on a stud. A sheath, generally of stainless steel, covers the wrench flats and encloses the end opposite to the conical end while leaving the threaded opening of the nut at the conical end exposed. Such sheaths are generally held on the nut body by various methods of attachment, including crimping against the nut body, adhesives and, as done in similar capped nut parts, by welding the cap to the nut.

An example of a welded capped wheel nut is shown in U.S. Pat. No. 4,123,961. A method and apparatus for forming a wheel nut with a welded cap is disclosed in U.S. Pat. No. 4,056,862. In the nut of that patent, the free end of a sheath which has been crimped against the section of the nut body that connects the end of the wrench flats to the conical wheel engaging surface is contacted, with pressured engagement, by a welding electrode. A second electrode is brought into pressured engagement with a section of the sheath that lies over a surface of the nut body to force the sheath area into intimate engagement with the nut body. An electric pulse, which may be produced by a bank of capacitors, having a duration of less than 30 microseconds and a peak current in excess of 50,000 amperes is passed between the first and second electrodes. The second electrode is said to impose a force of at least 1,000 pounds per square inch between the sheath and the nut area adjacent to the sheath area contacted by the second electrode. A weld between the contacting surfaces at such adjacent areas is said to be thereby formed.

Thus, the method and apparatus disclosed in U.S. Pat. No. 4,056,862 requires that the two electrodes contact the nut and sheath and that the electrode contacting the sheath apply considerable force. Moreover, as shown in that patent, the method and apparatus form only one welded capped nut at a time which results in inefficiency, both in terms of reduced output per unit time as well as uneconomical use of welding energy. Since the use of welded capped nuts by automobile manufacturers is increasing in popularity, there exists a need for a method and apparatus which overcomes the deficiencies of the above described method and apparatus and provides advantages thereover.

SUMMARY OF THE INVENTION

The present method and apparatus for welding caps to wheel nuts provides the advantages of producing two welded capped nuts per welding cycle while developing a more consistent welding current pattern and greater efficiency in use of welding current while utilizing an easily maintained electrode in contact with the sensitive welding surfaces of the caps.

The foregoing is achieved, according to this invention, through the provision of a method and apparatus for wheel nut cap welding in which two capped wheel nuts are axially aligned with their capped ends facing one another and spaced apart from one another by a cylindrical electrically conductive ring the opposite ends of which contact the sheath of the capped nut adjacent the area at which the weld has to be formed. The capped nuts and ring are telescopically assembled with a cylindrical guide sleeve of insulating material so that the conical, threaded opening end of each of the nuts extends beyond the ends of the guide sleeve whereby they are each contacted by cylindrical electrodes having conical indentations to fit the nut conical ends. The cylindrical ring positioned between the nuts constitutes a connecting electrode within the guide sleeve of insulating material so that the electrical current may pass from one of the electrodes in contact with the conical end of a nut through the nut and connecting electrode and to the other electrode contacting the conical end of the other nut to form a welding circuit.

Thus, an object of this invention is the provision of a method and apparatus for welding a cap to a wheel nut in which two welded capped wheel nuts are produced per welding cycle.

The arrangement of two capped nuts in series in the welding process and apparatus of this invention enables the use of higher welding voltage to drive higher instantaneous amperage through the welding circuit so that the desired energy to create the welds is supplied more quickly.

This speed up enhances the localization of the production of heat at the welds, and also reduces the time for heat to dissapate into surrounding metal before welding heat is attained. This results in more effective use of available welding machinery. For example, 30,000 amps for 10 milliseconds has been found to work satisfactorily. Voltage increase and stored energy decrease by reducing the number of capacitors used, and only a single assembly inserted for welding does not seem to produce good effects. Sparking and undesirable surface effects appear. Therefore, there is a advantage that is obtained from the synergistic effect of welding two capped nuts in series, including an advantage that arises from the fact that individual deviations in one particular cap tend to be compensated for by such a procedure.

Therefore, a further object of this invention is the provision of a method and apparatus for welding caps on to wheel nuts that results in more efficient use of welding energy as well as reduction of undesirable current side effects on the cap and/or nut being welded.

The apparatus for welding the caps to the nuts may efficiently include multiple stations in which the various processing steps can be carried out, such as loading, assembly, welding and inspection stations. The connecting ring electrode positioned between the nuts and the insulating guide sleeve is the electrode which applies the force to the cap areas being welded and produces the welds. Advantageously, this connecting ring electrode is subject to less use than the electrodes which contact the nut conical ends because of the number of stations involved. That is, the assembly containing the connecting ring electrode, the two capped wheel nuts and insulating guide sleeve are carried on several stations for indexing to the welding station and therefore the ring electrode finds less use in one complete indexing cycle than the electrodes at the welding station and this is also more readily replaced as it wears. This reduces undesirable surface effects on the cap because of electrode wear.

Thus, a yet further object of this invention is the provision of an assembly and welding apparatus and method which enables a more efficient and economical operation of welding capped wheel nuts while also providing the easy and convenient replacement of spent electrodes.

The foregoing and other objects, features and advantages of this invention will be further apparent from the following description of preferred embodiments thereof taken in conjunction with the accompanying drawings and the claims appended hereto.

BRIEF DESCRIPTION OF THE DRAWINGS

Referring to the accompanying drawings:

FIG. 1 is a view, in perspective, of a capped wheel nut made in accordance with the method of an embodiment of the present invention;

FIG. 2 is a view, in section, taken along the line 2—2 of FIG. 1, illustrating the interior of the capped wheel nut and the welded area between the cap and the nut;

FIG. 3 is a front view, in section, of a welding fixture apparatus according to an embodiment of this invention, illustrating the process of welding two capped nuts at the same time;

FIG. 4 is an enlarged view, in section, of the area of weld between the cap and the nut body according to an embodiment of this invention;

FIG. 5 is an enlarged view, in section, of another form of weld according to another embodiment of this invention; and FIG. 6 is a schematic plan view of an assembly and welding machine for carrying out the process of this invention.

DESCRIPTION OF THE PREFERRED EMBODIMENTS

Referring to FIGS. 1 and 2, there is illustrated a capped wheel nut indicated generally at 10. The nut body 12 has a threaded central opening 14 and hexagonal wrench flats 16 parallel to the axis of the opening. One end, 18, of the nut body 12 possesses a conical configuration which is adapted to mate with the conical depressions typically formed around the stud holes in a automotive wheel. The foregoing are conventional aspects of a wheel nut and the specific details of the configuration or relationship of proportions concerning those features are unimportant to the present invention. Those skilled in the art will understand that variations from the configuration shown in FIGS. 1 and 2 for the nut body, as pertains to the foregoing aspects, can be made.

The end, 20, of the nut opposite from the conical end 18 is formed with a slightly sloping surface 22 which slopes downward when considered in the direction from the wrench flats 16 toward the central threaded opening 14. At the end of the sloping face 22, adjacent to the wrench flat 16, there is an undercut portion 24, the purpose of which will be explained in greater detail below.

The nut body 12 is covered by a cap 26 formed of sheet metal such as stainless steel. The cap has hexagonal sections 28 which correspond to and fit over the hexagonal wrench flats 16. The cap extends downward over the nut body 12 to a position short of the conical portion 18 so as not to interfere with application of the nut to a stud in fastening the automotive wheel to the automobile. Capped wheel nuts, as such, are known and the purposes of the caps such as 26 are both protective and decorative. It will be understood that to the extent to which the configuration of the cap 26 is decorative, the configuration illustrated in FIGS. 1 and 2 is illustrative only. Thus, for example, in place of the dome 29 the cap 26 may have a different configuration such as a flat appearance.

The cap 26 is formed with a substantially flat surface 30 which extends normal to the axis of the opening 14 and has circumferential boundaries which are concentric to the axis of the opening 14. This surface 30 contacts the end 20 of the nut body 12 at at least one continuous location along the sloping surface 22 as illustrated at 32. It is at this location 32 that the weld between the cap 26 and the nut body 12 is formed.

FIG. 3 illustrates the welding apparatus for carrying out the method of this invention. The apparatus includes a press, indicated generally at 40, having a lower platen 42, which may be fixed, and a upper platen 44, which is movable, and conventional mechanisms for press operation. A lower electrode die 46 is supported in the platen 42. An upper electrode die 48 is supported in the upper platen 44. A non-conductive annular guide sleeve 50 is supported on a carrier 52 for surrounding the capped nuts to be welded, as explained in detail hereinafter. An annular cylindrical or ring-like connecting electrode 54 of copper or other conductive material is removably inserted within the guide sleeve 50 between the capped nuts to be welded to provide electrical contact therebetween. A movable lifter 56 operates in reciprocal fashion within the lower electrode 46 to contact one of the capped nuts being welded in order to urge it against the connecting electrode 54 which in turn is urged against the other capped nut being welded to provide the necessary contact for satisfactory welding operation. The apparatus also includes the necessary means for providing adequate welding current through a welding circuit, illustrated at 58, connected to the electrodes 46 and 48 and to a charging transformer and capacitors as is known in the welding art.

According to the process of this invention, the nut body 12 is provided with a end 20, FIGS. 2 and 4, which has a sloping surface 22 and fitted with a cap 26 having a surface 30 which contacts the nut end 20 along a thin ridge 32. The capped nut is then placed in the electrode die 46, as shown in FIG. 3, the non-conducting sleeve 50 placed thereover and the annular conducting electrode 54 inserted over the capped nut, as shown at 60. Another capped nut is then placed upside down, as shown at 62, to contact the conducting electrode 54 after which the top electrode die 48 is caused to contact the conical end of the second capped nut by moving the platen 44. Through movement of the platen 44 and the lifter 56 the two nuts are urged towards one another and make firm contact between the annular electrode 54 and the caps 26 which in turn contact the nut body 12 at the ridge point 32 described above. At this time, a welding current is applied and a weld formed between the cap and the nut body.

In the welding process, according to this invention, the thin contact ridge 32 is melted and, as a result of the force applied to the capped nut, collapses somewhat so that there results a net gain in the cross sectional area of contact between the cap portion 30 and the nut end 20. At the same time, the undercut portion 24 of the nut body 12 assures that a satisfactory weld is achieved. That is, as a consequence of the undercut portion 24, the area of nearest contact between the cap portion 30 and the nut end 20 is removed thereby assuring that the welding current will not stray or migrate but rather will be concentrated at the point of contact, 32, thereby resulting in a better weld, including reduction of imperfections or blemishes which may appear as a consequence of straying current on the cap exterior, and more efficient use of welding power. Thus, the combination of the sloping end face 22, the thin ridge contact 32 and the undercut portion 24, together with the process of applying force to collapse the thin ridge contact point simultaneously with the application of welding current, all function synergestically together to provide distinct improved advantages in the capped nut welding method.

As shown, the welding method according to this invention welds two capped nuts per welding cycle. The advantages of this include much more than doubling the output per welding cycle. Thus, by welding the two capped nuts in the specific manner illustrated, that is in series, there results a larger voltage drop which increases welding efficiency and results in less amperage being required. Since a higher voltage is utilized, the welding time necessary, that is, the requirement to melt the steel, is reduced. It is estimated that the amperage required is appropriately 30,000 amps for ten milliseconds. The larger voltage drop arising as a consequence of welding two capped nuts in series produces a better weld, according to the process of this invention, whereas merely increasing the voltage and decreasing the amperage in welding a single capped nut alone would not achieve the same result. In increasing voltage and decreasing amperage for welding a single capped nut alone there would result sparking and scarring of the cap which is undesirable.

Further advantages are realized, in the process of this invention, through the provision of the annular conducting electrode 54. Since one of the primary objects of the cap is aesthetic appearance, it is important to avoid scarring on the crown of the cap as a result of the electrical welding. However, electrodes, since they are made of copper for conductivity, are soft and become worn. As they wear, the chances of scarring increase significantly. Moreover, considerable heat is generated in the thin area of the weld between the cap and nut. Although scarring is a concern on the cosmetic exterior cap surface, it is not a problem if it occurs at the conical end of the nut body 12.

In the method and the apparatus of the present invention, the annular electrode 54 is the electrode which becomes the hottest during the welding operation and also that which is of the greatest concern with respect to possible scarring of the cap surface. However, this electrode is readily changeable and in a properly sequenced operation, as explained below, is able to cool down since its use in a cycle of several nut welding operations can be reduced in comparison to the main electrodes 46 and 48.

FIG. 6 is a schematic illustration of the welding cycle. A rotating table 70 is, for purposes of illustration, indexable to six stations. At stations 1, 2 and 3 loading and preassembling steps take place. That is, referring also to FIG. 3, at stations 1 and 2 the two capped nuts and the copper ring electrode 54 are preassembled as one unit. Thereafter, at station 3 the non-conductive sleeve 50 may be positioned over the preassembled capped nuts and ring electrode. At station 4, the entire assembly is inspected and at station 5 the die electrodes are positioned in place and the welding operation takes place. At station 6 the die electrodes 46 and 48 and the non-conductive sleeve 50 are withdrawn and the assembly of the two capped nuts and electrode ring 54 drop into a chute such as 72, for subsequent recovery.

In the operation illustrated, the welding takes place each time the table 70 is indexed so that six welding operations occur in one rotation of the table 70. However, the ring electrode 54 is making its way around the stations only one time during those six operations so that it is used only one-sixth the time that the die electrodes 46 and 48 are being used. As a result, wear of the ring electrode 54 is reduced and the ability to be cooled is increased so that the scarring on the surface of the cap is minimized.

FIG. 5 illustrates an alternative form of producing the weld between the cap 26 and the nut body 12. In this embodiment, a welding preform 34 in the shape of a ring is positioned between the surface 30 and the cap 26 and a substantially flat surface 36 of the nut body 12. The preform 34 thus provides the contact area and also is the portion that is melted as the welding current is applied.

Thus, there has been disclosed a method and apparatus for welding a cap to a nut to produce a welded cap wheel nut which method and apparatus provide advantages not heretofore obtained that result in not only increased efficiency in production but also in an improved welded capped wheel nut. I claim:

1. The method of welding a cap to a nut body to form a welded capped nut comprising the steps of taking a pair of nuts each having a nut body with a bottom engaging end, a top end opposite said bottom end, a threaded opening between the two ends for receiving a securing stud, a plurality of wrench flats extending between said top end and said bottom end, a sheath-like cap covering said top end and said wrench flats, said cap being capable of contacting said top end of said nut body, positioning said pair of capped nuts in linear spaced-apart alignment with their top ends opposed to one another, positioning an open ring-like connector of electrically conductive material between said aligned capped nuts and in contact with said tops thereof, surrounding said aligned capped nuts with an open sleeve of electrically nonconductive material, the ends of said sleeve extending to at least a portion of the respective nut bodies leaving said bottom ends thereof exposed, bringing one each of a pair of welding electrodes into contact with each respective exposed bottom end, applying sufficient pressure to said electrodes to cause said ring-like connector to urge said caps of each nut into contact with said top ends of said nut body and to form a welding electrical circuit, and applying a current between said electrodes sufficient to weld each of said caps to their respective nut bodies at a location of contact between said caps and said top end of said nut body.

2. The method as claimed in claim 1 wherein said top end of said capped nut body has a surface which slopes inward from said nut body exterior toward said threaded opening at an angle to a plane normal to the axis of the opening, said cap surface in juxtaposition therewith being essentially flat and said cap contacting said top surface of said nut body at a thin, ridge-like location only.

3. The method as claimed in claims 1 or 2 wherein said nut body has an undercut portion extending circumferentially at the location where said top end meets said wrench flats and said welding current is thus caused to flow through said location of contact between said top end and cap thereby reducing unwanted current migration and minimizing risks of electrical scarring of the cap surface.

4. The method as claimed in claims 1, 2 or 3 comprising performing the method steps at a plurality of stations of operation, one station of which includes solely the welding operation so that for each welding operation using said electrodes at least more than one other operation is carried out resulting in more than one arrangement of aligned nuts with said ring-like connector therebetween being assembled so that said ring-like connector is used in a welding operation less often than said electrodes.

5. The method as claimed in claim 1 further comprising inserting a welding metal preform between said top end of said nut body and said cap.

6. The method as claimed in claim 1 wherein the amperage of said welding current is no greater than 30,000 amps.

7. The method as claimed in claim 6 wherein said welding current is applied for no longer than 10 milliseconds.

8. Apparatus for welding a cap to a nut body to form a welded capped nut having a nut body with a bottom engaging end, a top end opposite the bottom end, a threaded opening between the two ends for receiving a securing stud, a plurality of wrench flats extending between said top end and said engaging end, a sheath-like cap covering said top end and said wrench flats and capable of contacting said top end of said nut body, said apparatus comprising an open ring-like connector of electrically conductive material adapted to be positioned between a paw of linearly aligned spaced-apart capped nuts with said top ends opposite one another and in contact with said caps thereof, an open sleeve of electrically nonconductive material for surrounding said aligned capped nuts, the ends of the cylindrical sleeve extending to at least a portion of said respective nut bodies leaving said engaging ends thereof exposed, a pair of welding electrodes adapted to contact each respective exposed engaging end, means for applying sufficient pressure to said electrodes to cause said ring-like connector to urge said caps of each nut into contact with said top ends of said nut body and to form a welding electrical current path, and means for applying a current between said electrodes sufficient to weld each of said caps to their respective nut bodies at a location of contact between said caps and said top end of said nut body.

9. Apparatus as claimed in claim 8 further comprising indexing table means for providing a plurality of stations for carrying out the positioning and welding operation.

10. The method of welding a cap to a wheel nut comprising the steps of holding two capped nuts in an aligned position wherein the capped nuts pair is held capped end to capped end and spaced by a ring-like connector of electrically conductive material, placing a sleeve of electrically non-conductive material around said aligned nuts to leave thread engaging ends of the nuts exposed, bringing electrodes into contact with said exposed end of each nut, and then applying pressure to at least one of said electrodes while applying welding current through said electrodes, said capped nut pair, and through said connector to weld said caps to said nuts at points of contact where said nut and cap are pressed together.

11. The method defined in claim 10 wherein each nut body has a shoulder engaging a cap shoulder on an underside of each cap at a point opposite the engagement of said ring-like connector with each cap and the pressure drives each cap and nut shoulder together to hold said caps and nuts closely for electrical conductivity and to form a good weld at said points of contact along said shoulders.

12. The method defined in claim 11 comprising placing a first capped nut in a first electrode, placing said non-conducting sleeve over said first capped nut, placing said electrically conducting connector inside said sleeve and over the top of said cap of said first nut, placing said second capped nut on top of said connector with its capped side down, bringing a second electrode into contact with said second capped nut to complete an electrical welding circuit through each capped nut and then applying pressure and welding current to press said caps onto said nuts while said caps are welded thereto.

* * * * *